Patented Dec. 5, 1950

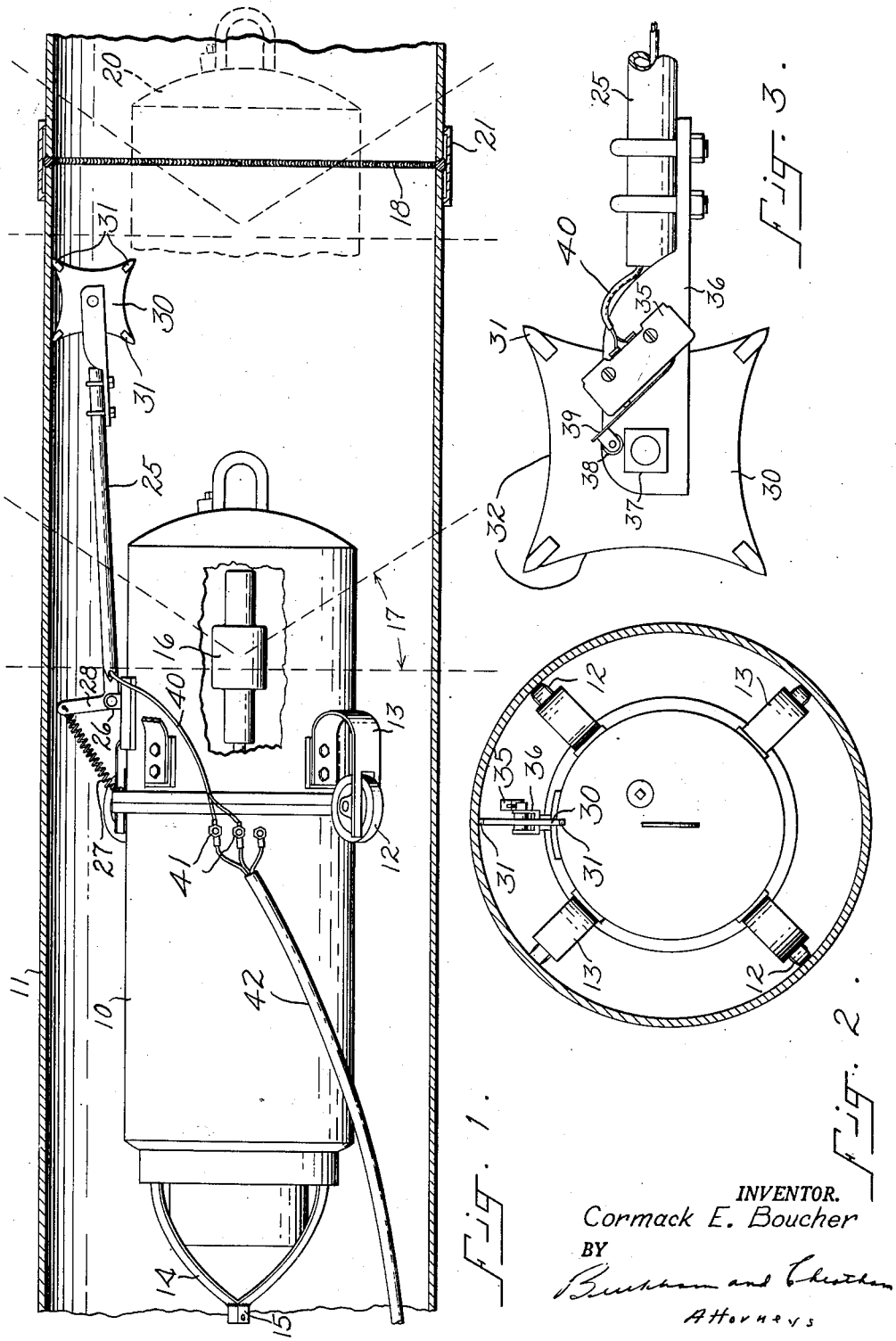

2,532,536

UNITED STATES PATENT OFFICE 2,532,536

METHOD AND APPARATUS FOR LOCATING WELDS IN HOLLOW METAL BODIES

Cormack E. Boucher, Seattle, Wash.

Application June 9, 1948, Serial No. 32,028

9 Claims. (Cl. 250—65)

The present invention relates to methods and apparatus for locating irregularities on otherwise smooth surfaces. More specifically the apparatus of the present invention is particularly adapted for use in locating welds in the walls of hollow, metal bodies.

In the radiographing of annular welds of cylindrical bodies such as pipes, it is desirable to pass the source of penetrative rays through the interior of the pipe and radiograph the welded section by wrapping a film around the weld and expose the film throughout 360° with a single exposure. Portable X-ray units have been developed together with propulsion means therefor whereby welded sections of approximately a mile or so in length may be radiographically inspected while the X-ray unit and its propelling tractor may be controlled from one end of the pipe line section. For exposing the film about any one welded section, the X-ray unit must be accurately positioned with respect to the weld and, in the case of long pipe lines, it is impossible or impracticable for an operator to travel through the pipe with the apparatus. Various means have been proposed heretofore for guiding the positioning of the source of penetrative rays within the pipe line with respect to the welded section, but, prior to the present invention, none of these means has been entirely satisfactory.

It is an object of the present invention, therefore, to provide a new and improved method and apparatus for locating welded sections in hollow, metal bodies.

In the welding of wall sections of hollow, metal bodies together, the adjacent wall sections are spaced a slight distance apart in order that the weld bead will form a homogeneous union between the wall sections throughout their entire thickness. The weld bead thus inherently forms an irregularity on the inner surface of the body usually in the form of a protuberant ridge, although, under certain circumstances, the irregularity might be in the form of a slight depression. By extensive observation, it has been noted that it is virtually impossible to weld two adjacent metal wall sections together without forming an irregularity of one sort or another at the juncture. The irregularity thus formed by the welding operation provides an excellent means for positively locating the welded section and for facilitating the positioning of the penetrative ray apparatus with respect thereto.

It is a further object of the present invention, therefore, to provide a new and improved means for mechanically feeling the inside of a hollow, metal body for location of a welded section thereof.

A further object of the present invention is to provide a new and improved apparatus for locating a welded section in a hollow, metal body by mechanically exploring the inner surface of the body for the irregularity resulting from the welding operation.

A still further object of the present invention is to provide a new and improved portable X-ray unit including means for locating welded sections of hollow, metal bodies for guiding the positioning of the X-ray unit with respect to such welded sections.

A further object of the present invention is to provide a new and improved method for positioning a penetrative ray apparatus within welded hollow metal bodies for radiographic inspection of the welded area.

For a consideration of what is believed novel and inventive, attention is directed to the following description taken in connection with the accompanying drawing while the features of novelty will be pointed out with greater particularity in the appended claims.

In the drawing, Fig. 1 is a longitudinal, side elevation illustrating the weld locating device of the present invention in accordance with one form thereof; Fig. 2 is a front end view of the apparatus shown in Fig. 1; Fig. 3 is an enlarged, side elevation illustrating certain details of the apparatus shown in Fig. 1.

Referring now to the drawings, the weld locating device of the present invention is illustrated as being mounted upon the housing of a portable X-ray unit 10 adapted for movement longitudinally within a hollow, metal body such as a cylindrical pipe line 11. The portable X-ray unit 10 is provided with a plurality of supporting wheels 12 arranged upon the ends of bracket arms 13, the various supporting wheels 12 being spaced about the X-ray unit 10 so as to support the unit in a predetermined, longitudinal, axial alignment with the pipe 11. The rear end of the X-ray unit is adapted to be supported by means of the bracket arm arrangement 14 upon the adjacent end of a conduit tractor (not shown), the ends of the arms 14 being provided with a coupling element 15 extending along the axis of the unit 10. It will be understood by those skilled in the art that, in the movement of a portable X-ray unit and tractor through a conduit, there will be an inherent tendency for the apparatus to rotate more or less about the horizontal axis particularly in negotiating bends in the pipe line. With the arrangement of the supporting wheels 12 and the connection 15 for the conduit tractor as shown, the X-ray unit 10 will be maintained substantially in coaxial alignment with the pipe line 11 irrespective of relative rotational movement of the X-ray unit 10 and the conduit tractor about the pipe axis.

Mounted within one end of the housing of the X-ray unit 10 is an X-ray tube, illustrated at 16, the tube being arranged coaxially with the longitudinal axis of the housing. The tube is preferably of a type capable of emitting X radiations throughout an angle of 360° and at least that portion of the housing surrounding the X-ray tube 16 is of a material relatively permeable to X radiations. It will be understood by those skilled in the art that the radiations passing outwardly from the tube spread over a radial area of considerable width, the angle of spread of radiation in the axial direction being indicated in the drawing by the angle 17. It is merely necessary, therefore, that the X-ray unit be so positioned with respect to an annular weld indicated at 18 so that the weld will lie within the angle 17 of the radiations emitted by the X-ray tube 16. The dotted lines 29 at the right of Fig. 1 illustrate the X-ray unit so positioned that the annular weld lies substantially in the center of the field of radiations emitted by the X-ray tube 16. A film holder 21 is shown wrapped around the outside of the pipe 11 and over the weld 18 containing a film which may be exposed throughout the full circumference of the weld at a single energization of the tube 16.

For locating the weld 18 inside of the pipe and for facilitating the positioning of the X-ray unit with respect thereto, I provide a detector responsive to the surface irregularity created by the weld bead on the inside of the pipe and which, in this instance, comprises an arm 25 pivotally mounted as at 26 upon the housing for the X-ray unit, the outer end of the arm 25 being biased toward the wall of the pipe 11 by means of a spring 27 arranged between the housing and the crank arm 28 formed on the end of the arm 25. The arm 25 extends considerably ahead of the forward end of the X-ray unit 10 and is provided on its forward end with a rotatable, slider element 30. The rotatable, slider element 30 is provided with a plurality of flattened, or concave sides 32 which sides are adapted to slide against the smooth, inner surface of the pipe 11. At least the leading edge portions of the sides 32 of the slider element 30 are sharpened in a direction transversely to the line of movement. In the modification shown, the corners of the slider element 30 are defined by hardened, steel inserts 31 and which are sharpened by sliding the various peripheral sides of the wheel across an abrasive stone with the inserts 31 at opposite corners of the wheel side simultaneously bearing against the stone surface. In this manner, sharp edges are formed on each of the tip portions. So long as the slider element 30 is moved along a smooth, wall surface, it will not rotate on the end of the arm; but, immediately upon engagement of the sharp leading edge 31 of the slider element with an irregularity in the surface of the pipe, the slider will resist continued forward movement and will rock through an angle of ninety degrees about the corner portion which will be held relatively stationary by the surface irregularity of the weld.

Any suitable means may be provided for actuation by the relative movement of the slider element 30 upon the end of the arm 25; but, as shown in the drawings, I provide an electrical switch 35 mounted on the bracket 36 pivotally supporting the slider element 30 upon the end of the arm 25. Fixedly secured to the shaft of and rotatable with the slider element 30 is a squared member 37 and which is engaged by a roller 38 mounted upon the end of a spring finger 39 secured at its opposite end onto the body of the switch 35. Upon rotation of the slider element 30, the spring finger 39 will be actuated so as, in turn, to actuate the contacts of the switch 35. The contacts of the switch 35 may be connected by a conductor 40 extending back along the arm 25 and to the terminals 41 on the X-ray unit housing. The signal can be carried rearwardly of the pipe line to the control station through the cable 42. Following the instant of the signal, the operator will allow tractor to push the X-ray unit farther ahead by a predetermined amount, corresponding to the distance between the element 30 and the center of the tube field. The tractor will then be stopped, the tube energized and the film exposed, following which the unit 10 can be shifted to the next weld.

Attention is directed to the fact that the pivotal supporting means for the arm 25 is arranged to the rear of the effective field of the radiations from the tube 16 while the rotatable slider element 30 and switch 35 extend considerably ahead of the field of radiations. It will be understood that, if the detector for weld locating unit comprising the slider element 30 and the switch 35 were mounted in the radial plane of the tube 16, the mass of such parts would cause an undesirable shadow upon the film.

In order that the arm 25 supporting the detector will not cast a shadow upon the film and thus, possibly, obscure certain portions thereof, it is preferred that the arm 25 be made of a material relatively permeable to X radiation, for example, aluminum or magnesium. For the same reason, the conductors 25 extending from the switch 35 should also be made of a similar material. It will be obvious that the arm 25 may be mounted otherwise than as shown upon the X-ray unit, or even upon the propulsion tractor, if desired.

Having described the invention in what is considered to be simplified, preferred embodiments thereof, it is desired that it be understood that the specific details shown are merely illustrative and that the invention may be carried out by other means.

I claim:

1. An apparatus for locating a weld in a hollow, metal body, said apparatus comprising a support adapted for movement inside said body, a member mounted on said support and adapted for rubbing along the inner surface of said body, said member including a portion normally inactive in passing over smooth surface portions of said body but active to cause actuation of said member upon engagement thereof with an irregularity on the inner surface of said body, and means operatively associated with said member for providing an indication upon actuation of said member.

2. An apparatus for radiographing a weld in a hollow, metal body, said apparatus comprising a support adapted for movement inside said body, a source of penetrative rays mounted on said support, an arm pivotally mounted on said support, means biasing said arm toward the wall of said body, a slider element movably mounted on the end of said arm for engaging against the surface of said body, said slider element including a sharp edged portion, said sharp edged portion being adapted to slide freely along a smooth surface but to offer resistance to further forward movement upon contact with any surface irregularity of said body, and indicator means operatively associated with said element for providing an indication upon engagement of said element with a surface irregularity.

3. An apparatus for radiographing an annular weld in a hollow, metal body, said apparatus comprising a support, a source of penetrative rays mounted on said support and adapted to be carried thereby along the inside of said body, an arm mounted on said support, one end of said arm extending toward a side wall of said body, a slider element mounted on the end of said arm and adapted to slide along the surface of said body, a forward edge of said slider element being sharpened in the direction transverse to the line of movement of said support and adapted for resisting the movement of said slider element upon engagement with a surface irregularity of said body, and an indicator means operatively associated with said slider element and adapted to be actuated thereby upon engagement of said edge with a surface irregularity on said body.

4. An apparatus for radiographing an annular weld of a hollow, cylindrical, metal pipe, said apparatus comprising a housing, a plurality of wheels mounted on said housing in a spaced apart relation thereabout for supporting said housing in a predetermined, aligned relation with the axis of said pipe, an X-ray tube mounted in said housing capable of emitting radiations throughout an angle of 360°, an arm pivotally mounted on said housing, spring means biasing one end of said arm toward the side wall of said pipe, a slider element mounted on the end of said arm and adapted to slide along the surface of said pipe, the leading edge portion of said slider element being sharpened transversely to the line of movement whereby upon engagement with an irregularity on the surface of said pipe continued forward movement of said slider element will be resisted, an indicator means mounted on said arm and adapted for actuation by said slider element upon contact with a surface irregularity.

5. An apparatus for radiographing an annular weld in a cylindrical, metal pipe, said apparatus comprising a housing, a plurality of wheels secured to said housing for engaging with the inner surface of said pipe at spaced apart points around said housing for supporting said housing in a predetermined aligned relation with respect to the longitudinal axis of the pipe, a source of penetrative rays mounted within said housing capable of emitting penetrative radiations throughout an angle of 360° about the axis of said pipe, an arm pivotally mounted on said housing, spring means biasing one end of said arm toward the side wall of said pipe, a rotatable slider element mounted on the end of said arm, said element having a plurality of flattened sides, the leading edges of said flattened sides being sharpened whereby upon engagement of said sharpened edges with an irregularity on the surface of said pipe, said slider element will be caused to rotate upon said arm, a switch mounted on said arm cooperatively adjacent said slider element and adapted to be actuated thereby so as to provide an indication for the location of the weld.

6. The method of radiographing a weld in a hollow body which comprises positioning a film over said weld on the outside of said body, passing a supporting means for a source of penetrative rays into said body, feeling the inner surface of said body with a feeler on said means responsive to engagement thereof with the roughened area formed by said weld, positioning said source adjacent said area and exposing said film with said source.

7. The method of radiographing a weld in a hollow body which comprises positioning a film over said weld on the outside of said body, passing a supporting means carrying a source of penetrative rays through said body and spaced a predetermined distance from said body, feeling the inner surface of said body with a feeler on said means responsive to engagement thereof with rough surface portions for locating the roughened area of the weld a predetermined distance ahead of said source and then moving said source ahead said predetermined distance and exposing said film with said source.

8. The method of radiographing a weld in a hollow body, which comprises positioning a film over said weld on the outside of said body, inserting a source of penetrative rays into said body, feeling the inner surface of said body for the roughened area thereof formed by the weld bead with a feeler responsive to engagement thereof with a rough surface portion, moving said source into a position beneath said area and exposing said film with said source.

9. The method of radiographing a weld in a hollow body which comprises positioning a film over said weld on the outside of said body, moving a source of penetrative rays inside said body, feeling the inner surface of said body with a feeler responsive to engagement thereof with a rough surface portion a predetermined distance ahead of said source for locating the roughened area thereof formed by said weld, and after said area is located moving said source ahead by an amount equal to said predetermined distance and then exposing said film with said source of rays.

CORMACK E. BOUCHER.

REFERENCES CITED

The following references are of record in the file of this patent:

UNITED STATES PATENTS

| Number | Name | Date |
| --- | --- | --- |
| 1,662,429 | Lowy | Mar. 13, 1928 |
| 2,091,522 | Perry | Aug. 13, 1937 |
| 2,201,311 | Halliburton | May 21, 1940 |
| 2,307,887 | Haynes | Jan. 12, 1943 |
| 2,313,310 | Arnold | Mar. 9, 1943 |
| 2,339,274 | Kothny | Jan. 18, 1944 |
| 2,340,923 | Boucher | Feb. 8, 1944 |
| 2,350,832 | Segesman | June 6, 1944 |
| 2,371,658 | Stewart | Mar. 20, 1945 |
| 2,412,174 | Rhoades | Dec. 3, 1946 |
| 2,436,047 | Martin | Feb. 17, 1948 |
| 2,470,743 | Hochgesang | May 17, 1949 |